United States Patent
Schultz et al.

(10) Patent No.: US 9,546,728 B2
(45) Date of Patent: Jan. 17, 2017

(54) BALANCED BINARY PUMP FOR CVT TRANSMISSION

(71) Applicant: GM Global Technology Operations LLC, Detroit, MI (US)

(72) Inventors: John C. Schultz, Saline, MI (US); Daryl A. Wilton, Macomb, MI (US); Philip C. Lundberg, Keego Harbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 207 days.

(21) Appl. No.: 14/247,867

(22) Filed: Apr. 8, 2014

(65) Prior Publication Data

US 2015/0285371 A1    Oct. 8, 2015

(51) Int. Cl.
*F16H 61/00*    (2006.01)
*F16H 39/24*    (2006.01)

(52) U.S. Cl.
CPC .......... *F16H 61/0025* (2013.01); *F16H 39/24* (2013.01); *F16H 61/0031* (2013.01)

(58) Field of Classification Search
CPC  F16H 61/0025; F16H 39/24; F16H 2061/662; F04C 11/001
USPC .......................................................... 60/486
See application file for complete search history.

(56) References Cited

U.S. PATENT DOCUMENTS

| | | | |
|---|---|---|---|
| 2,642,802 A * | 6/1953 | Gardiner | F04C 2/3446 418/133 |
| 4,415,319 A * | 11/1983 | Masuda | F04C 15/0023 418/135 |
| 5,213,491 A * | 5/1993 | Fujiwara | F04C 11/001 418/133 |
| 5,289,741 A | 3/1994 | Debs et al. | |
| 5,454,764 A | 10/1995 | Koenig et al. | |
| 6,258,010 B1 | 7/2001 | Bai et al. | |
| 6,386,836 B1 * | 5/2002 | Johnson | F04C 11/001 417/310 |
| 6,464,609 B1 | 10/2002 | Bai et al. | |
| 6,579,070 B1 * | 6/2003 | Birkenmaier | F01C 21/0863 417/216 |
| 6,702,081 B2 | 3/2004 | Gorman et al. | |
| 6,964,631 B2 | 11/2005 | Moses et al. | |
| 7,136,735 B2 | 11/2006 | Carlson et al. | |
| 7,228,783 B2 | 6/2007 | Lochocki, Jr. et al. | |
| 8,037,989 B2 | 10/2011 | Neelakantan et al. | |
| 8,042,331 B2 * | 10/2011 | Schultz | F16H 61/0025 60/449 |
| 8,105,049 B2 | 1/2012 | Schultz | |

(Continued)

FOREIGN PATENT DOCUMENTS

DE    3132285 A1    3/1983
DE    102010007255 A1    8/2011

*Primary Examiner* — Thomas E Lazo

(57) ABSTRACT

A flexible binary pump system for a motor vehicle transmission includes a shaft, a first vane pump mounted on the shaft and having a first rotor with a first diameter and a first width and a second vane pump mounted on the shaft and having a second rotor with a second diameter and a second width. The first vane pump provides hydraulic fluid to the transmission at a first pressure, and the second vane pump provides hydraulic fluid to the transmission at a second pressure. The first diameter, first width, second diameter, and second width are selected to optimize power consumption of the binary pump system and hydraulic fluid budget for the transmission.

19 Claims, 3 Drawing Sheets

(56) References Cited

U.S. PATENT DOCUMENTS

| | | |
|---|---|---|
| 2003/0158009 A1* | 8/2003 | Berger .............. F16H 61/66272 475/116 |
| 2009/0209383 A1 | 8/2009 | Olson et al. |
| 2010/0190606 A1 | 7/2010 | Moses et al. |
| 2010/0304927 A1 | 12/2010 | Neelakantan et al. |
| 2010/0326542 A1 | 12/2010 | Xie et al. |
| 2011/0040463 A1 | 2/2011 | Moses et al. |
| 2011/0198179 A1 | 8/2011 | Lundberg et al. |
| 2013/0309104 A1 | 11/2013 | Schultz et al. |
| 2013/0330216 A1* | 12/2013 | Yoshida .................. F15B 1/024 417/410.1 |

\* cited by examiner

BALANCED BINARY PUMP FOR CVT TRANSMISSION

FIELD

The present disclosure relates to a flexible binary pump for motor vehicle transmissions.

BACKGROUND

The statements in this section merely provide background information related to the present disclosure and may or may not constitute prior art.

Many modern motor vehicle automatic continuously variable transmissions (CVT) utilize controlled hydraulic fluid (transmission oil) to actuate CVT belt and pulleys (or chain and pulleys) to achieve a desired ratio in downsized turbo boosted engines to optimize fuel economy. The control of such hydraulic fluid is achieved by a valve body which comprises a plurality of spool valves which direct hydraulic fluid flow through a complex of passageways to CVT pulley pistons as well as other clutch and brake actuators. The valve body is supplied with pressurized hydraulic fluid from, typically, a gear or vane pump, which is driven by the engine output shaft or the transmission input shaft.

Because this is such a common transmission configuration and because of the manufacturing volume of such automatic transmissions, extensive research and development has been undertaken to reduce the cost and optimize the performance of such pumps. For example, simplifying such pumps to reduce their weight and cost, reducing their size to improve packaging, improving low speed performance, improving low temperature performance and reducing high speed energy losses have all been areas of development and improvement.

A fixed displacement pump provides flow proportional to engine speed. The pump is often sized to meet hydraulic pressure and volume demands of the transmission at low speed idle engine conditions. Friction forces inside the pump increase as the size of the surface area of the pump rotor increases. Accordingly, larger diameter higher displacement pumps that meet hydraulic demands of the transmission near engine idle speed often contribute to undesirable transmission spin losses and decrease efficiency of the transmission. A large pump will provide much greater oil flow than what is consumed by the transmission at higher engine speeds, with higher pump power consumption leading to loss in overall transmission efficiency.

The present invention is directed to improvements that reduce pump spin losses and improve transmission efficiency while meeting hydraulic demands of the transmission.

SUMMARY

A flexible binary pump system for a motor vehicle transmission includes a shaft, a first vane pump mounted on the shaft and having a first rotor with a first diameter and a first width and a second vane pump mounted on the shaft and having a second rotor with a second diameter and a second width. The first vane pump provides hydraulic fluid to the transmission at a first pressure, and the second vane pump provides hydraulic fluid to the transmission at a second pressure. The first diameter, first width, second diameter, and second width are selected to optimize power consumption of the binary pump system and hydraulic fluid budget for the transmission.

The pressure in the two discharge ports in each of the first pump and the second pump are balanced to minimize side loads on the shaft, which enables the binary pump system to operate with higher mechanical efficiency to reduce pump drag losses to improve fuel economy.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1A:
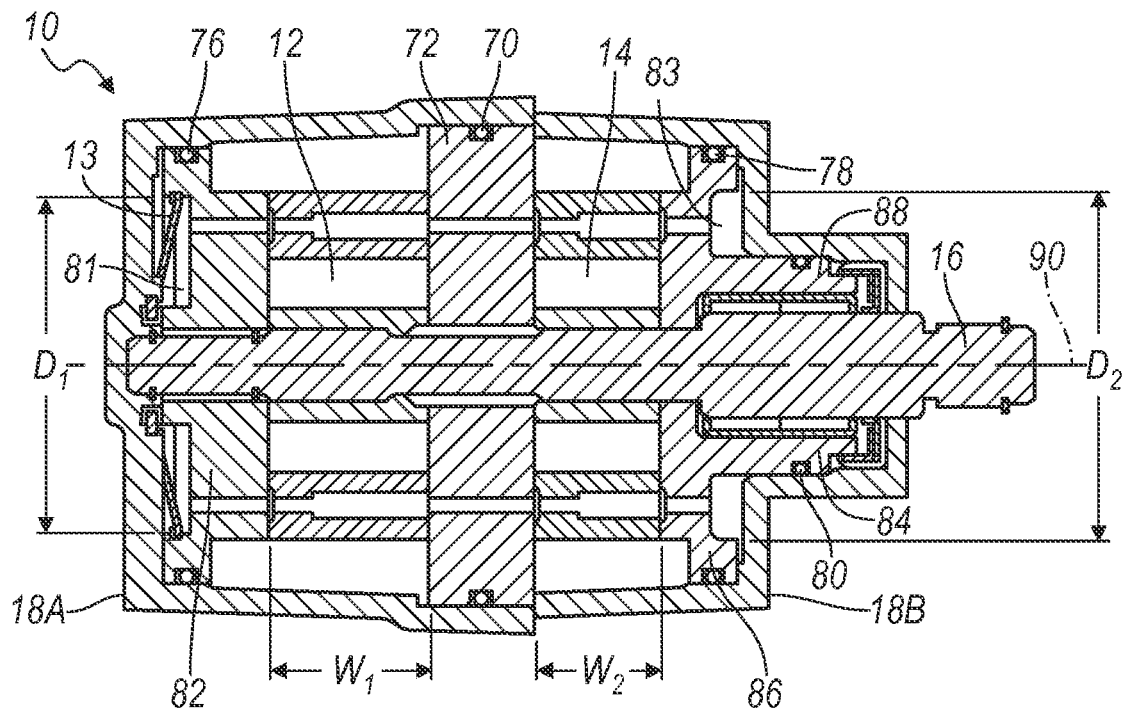
FIG. 1A is a cross-sectional view of a flexible binary pump in accordance with the principles of the present invention.
Figure 1B:
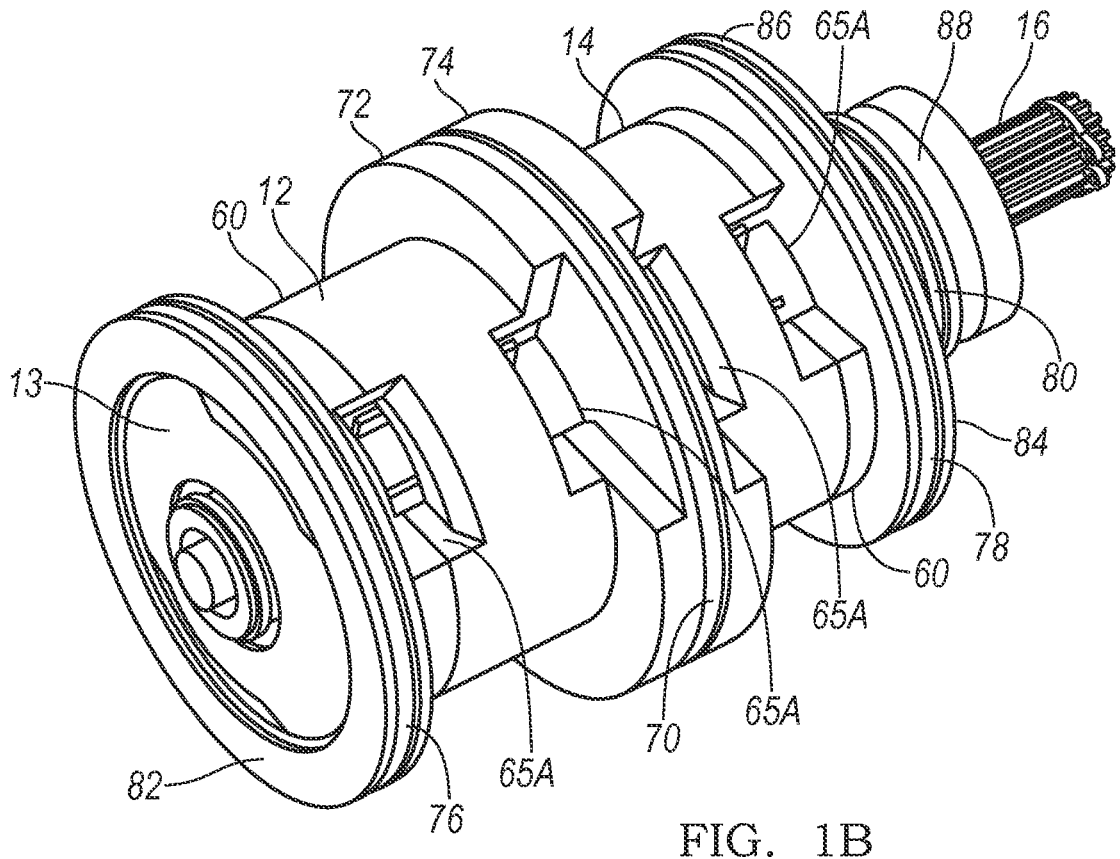
FIG. 1B is a perspective view of the interior of the flexible binary pump shown in FIG. 1A.

Referring now to the drawings, a flexible binary pump system embodying the principles of the present invention is illustrated in FIGS. 1A and 1B and designated at 10. The flexible binary pump 10 includes a high pressure pump 12 and a low pressure pump 14, both of which are balance vane pumps mounted about a shaft 16. In some arrangements, the flexible binary pump 10 is an off-axis pump driven by a chain that engages with a sprocket (not shown) attached to the shaft 16. Further details of off-axis pumps are described in U.S. Pat. No. 6,964,631 and U.S. patent application Ser. No. 13/475,559, filed on May 18, 2012 and entitled "Pump Assembly with Multiple Gear Ratios," the contents of both of which are incorporated herein by reference in their entirety. Such arrangements employ, for example, an electric motor with a one way clutch to drive a rotor set of a pump, whether the pump is a balanced vane pump or a Gerotor gear pump.

The high pressure pump 12 and the low pressure pump 14 are enclosed in a generally cylindrical housing 18 that can be formed of two parts 18a and 18b. The two parts 18a and 18b can be joined together by any suitable process, generally as a bolted assembly. In certain arrangements, the high pressure pump 12 and the low pressure pump 14 are spaced apart with a port plate such as plate 72. The flexible binary pump 10 further includes a priming spring 13 and O-rings 70, 76, 78 and 80. The priming spring 13 preloads the rotor sets 71 (FIG. 3) together to remove accumulated stack tolerance to prevent leakage for improving initial priming of each pump 12 and 14. The O-rings are made of any suitable material such as, for example, rubber. The O-ring 76 is mounted about a plate 82 such that the O-ring 76 forms a seal with the interior of the part 18a of the housing 18. A region 81 of high pressure hydraulic fluid discharged from the high pressure pump 12 is formed between the plate 82 and the housing 18A. The O-rings 78 and 80 are mounted about a large portion 86 and a small portion 88, respectively, of a circular plate 84 to form seals with the interior of the part 18B of the housing 18. As such, a region 83 of high pressure hydraulic fluid discharged from the low pressure pump 14 is formed between the O-ring seals. Further, the seal formed by the O-ring 80 with the interior of the part 18B prevents high pressure hydraulic fluid for leaking from the housing 18 along the shaft 16.

Figure 3:
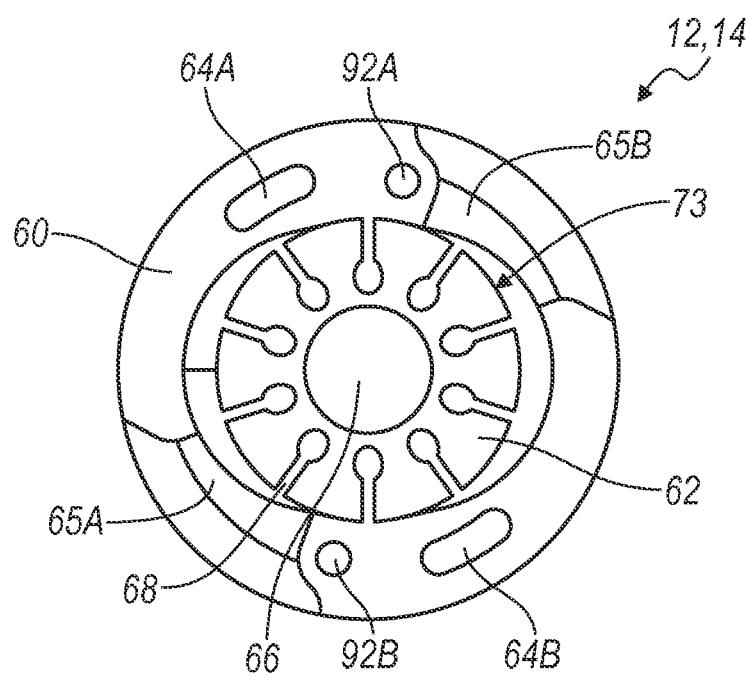
FIG. 3 shows a vane pump employed for each of the pumps in the flexible binary pump shown in FIG. 1A.
Figure 4:
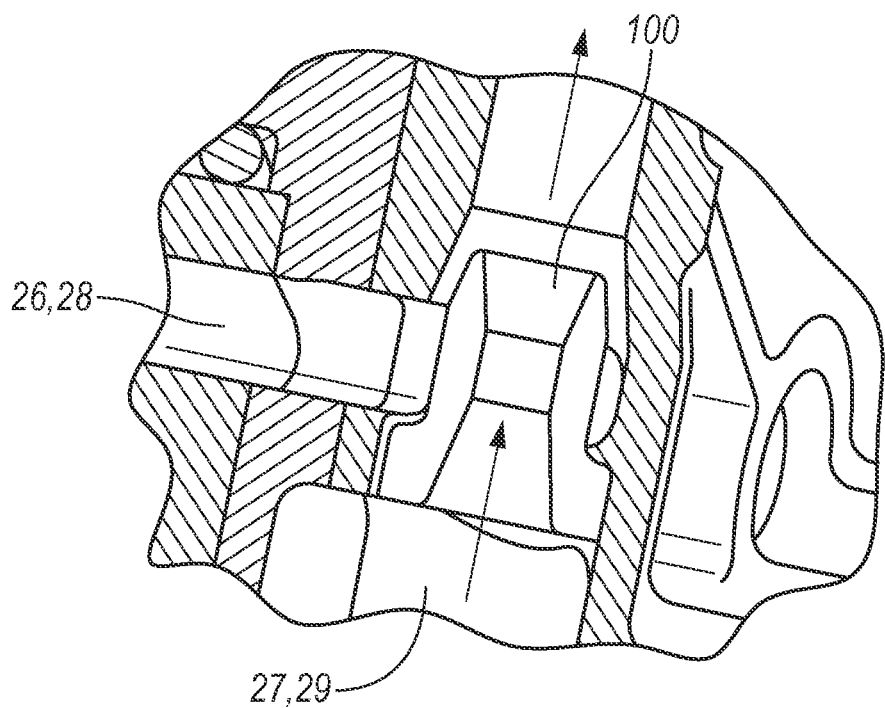
FIG. 4 shows an inlet nozzle that is implemented in alternative arrangements of the flexible binary pump shown in FIG. 1A.

Referring also to FIG. 3, each of the pumps 12 and 14 include a cam 60 and a rotor 62. The rotor 62 has a splined opening 66 that enables the rotor 62 to be mounted onto the splined shaft 16 so that the rotor 62 and the shaft 16 rotate in the interior of the cam 60. Each cam 60 includes a pair of discharge ports 64A and 64B and a pair of inlets 65A and 65B. Each rotor 62 includes a set of vane slots 68 so that as the rotor 62 rotates in the interior of the cam 60, hydraulic fluid is drawn into the inlets 65A and 65B to feed the regions 73 defined between the rotor 62 and the interior surface of the cam 60. The hydraulic fluid flows from the regions 73 and is discharged through the discharge ports 64A and 64B. Further details of balanced vane pumps are described in U.S. Pat. No. 8,042,331, the entire contents of which are incorporated herein by reference.

In some arrangements, the orientation of the discharge ports 64A and 64B of the high pressure pump 12 can be circumferentially offset about the axis 90 (FIG. 1A) from the orientation of the discharge ports of the low pressure pump 14 to mitigate pressure ripple disturbances, which provide more stable operation for flow delivery at high pressures. In other arrangements, the vane slots 68 of the high pressure pump 12 can be circumferentially offset about the axis 90 from the vane slots 68 of the low pressure pump 14 to mitigate tonal noise emanating from the binary pump 10, which provides improved NVH. The desired orientation of the high pressure pump 12 relative to the low pressure pump 14 can be achieved with the use of dowel pins 92A and 92B, which locate both pumps 12 and 14 to the port plate 72.

In particular arrangements, the plate 72 can be the same diameter as the pumps 12 and 14 with the O-ring 70 omitted to provide a common inlet for the pumps 12 and 14.

Figure 2:
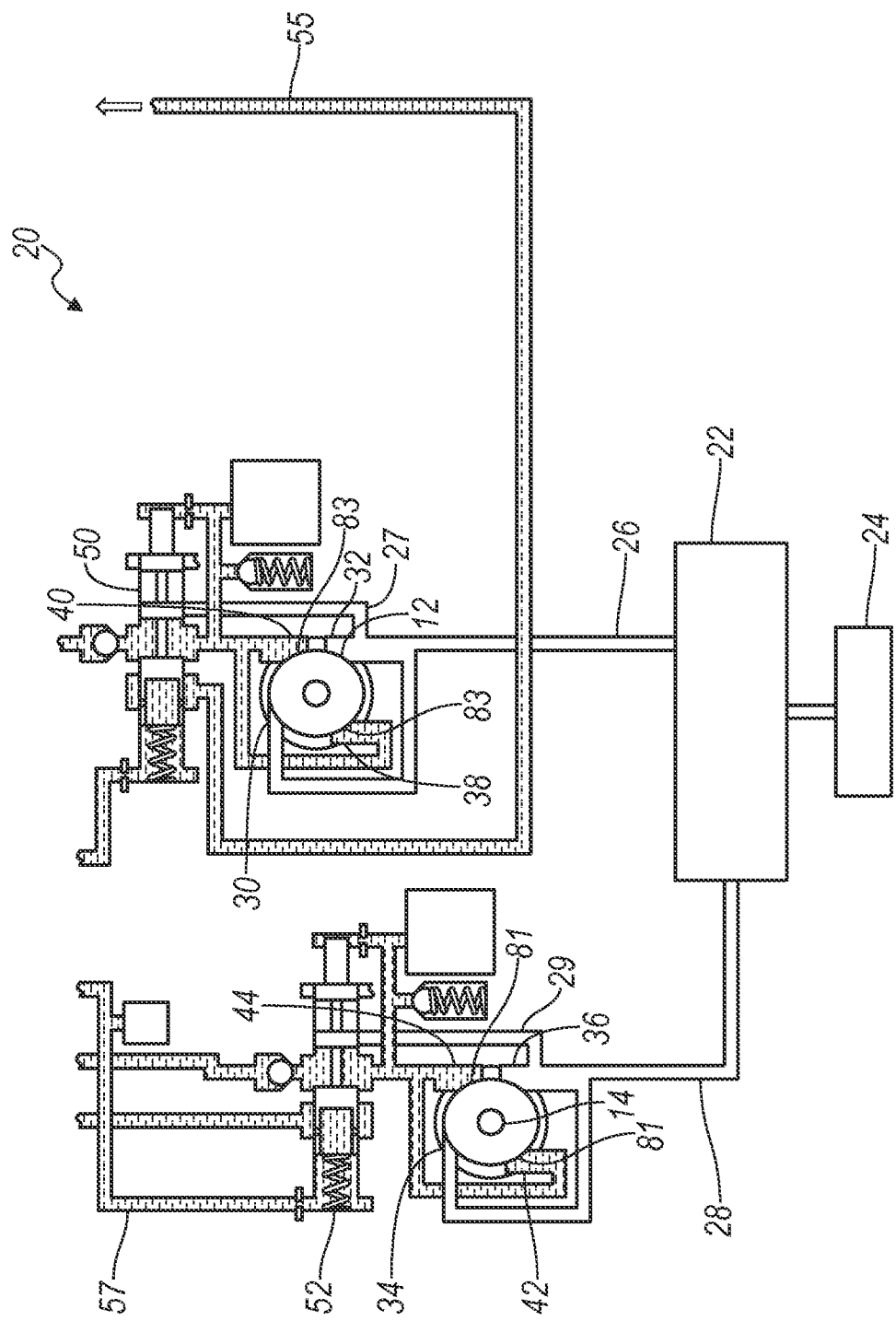
FIG. 2 is a diagram showing a portion of a hydraulic control system implementing the flexible binary pump shown in FIG. 1A.

Referring now to FIG. 2 with continuing reference to FIG. 1A, a portion 20 of a hydraulic control system is shown in which the high pressure pump 12 and the low pressure pump 14 can be implemented. When the hydraulic control system is in operation, hydraulic fluid is drawn from a filter 22 that receives the hydraulic fluid from a sump 24. A line 26 feeds the hydraulic fluid from the filter 22 to the high pressure pump 12, and a line 28 feeds the hydraulic fluid from the filter 22 to the low pressure pump 14. More specifically, the line 26 splits into two lines 30 and 32 that feed hydraulic fluid to the inlet ports 65A and 65B of the high pressure pump 12, and the line 28 splits into two lines 34 and 36 that feed hydraulic fluid to the inlet ports 65A and 65B of the low pressure pump 14.

Hydraulic fluid is discharged from the discharge ports 64A and 64B of the high pressure pump 12 which combine in the region 81 shown in FIG. 1A. This discharged hydraulic fluid from the high pressure pump 12 is also shown schematically as outlet lines 38 and 40 in FIG. 2 and is connected to a pressure regulator 50. The pressure regulator valve 50 feeds high pressure hydraulic fluid through a line 55 to pulleys of a continuously variable transmission (CVT).

Hydraulic fluid is discharged from the discharge ports 64A and 64B of the low pressure pump 14 to the region 83 shown in FIG. 1A. This discharged hydraulic fluid from the low pressure pump 14 is also shown schematically as outlet lines 42 and 44 in FIG. 2 and is fed to a pressure regulator 52. The pressure regulator valve 52 feeds low pressure hydraulic fluid through a line 57 to a torque converter, clutches, gears and a final drive gear set of the CVT.

In some arrangements, both pumps 12 and 14 can at times both be operated at high pressure, for example, up to about 65 BAR, for periods of time when the transmission demands maximum high pressure flow, such as, for example, for making fast ratio changes on the belt and pulleys. In certain arrangements, the function of the pressure regulator valves 50 and 52 can be implemented in a single valve of suitable design.

In particular arrangements, one or both of the inlet lines 26, 28 can be provided with a nozzle 100. Each nozzle 100 also receives hydraulic fluid from either or both pump bypass lines 27, 29. The nozzle 100 is especially useful for decreasing cavitation at high pump speeds. Consequently, the high speed fill limit can be increased above the typically maximum operating speed of an internal combustion engine. Additional details of the nozzle 100 can be found in U.S. Pat. No. 8,105,049, the entire contents of which are incorporated herein by reference.

As shown in FIG. 1A, the high pressure pump 12 has a diameter, D1, and a width, W1, and the low pressure pump 14 has a diameter, D2, and a width, W2. Each of the pumps 12 and 14 is a balanced vane pump so that the use of the two pumps 12, 14 allows each pump to individually keep a balanced load, that is, minimal or no side load, against the shaft 16 even when the pumps 12 and 14 are operated at different pressures. One pump can be operated at a very high pressure, such as, for example 65 BAR, while the other pump can be operated at near zero pressure, such as, for example, less than 5 BAR. Hence, the shaft diameter can be decreased, which enables the use of smaller rotors 62 and, therefore smaller pumps with less surface area on the face of the rotors 62. Note that this use of smaller diameter pumps provides less friction to reduce drag, which improves fuel economy of the vehicle.

In various arrangements, one or any combination of the diameters D1 and D2 and the widths W1 and W2 can be varied to change pump displacement for each rotor to optimize the oil budget demand in the hydraulic control system while meeting packaging constraints. Note that with a traditional binary pump, the pump delivers high pressure hydraulic fluid at either 100% or 50% of flow (referred to as a 50/50 split) since both discharge ports 64A and 64B have the same projected area against the shaft 16. The arrangement shown in FIG. 2 enables more optimized flow delivery including any desired flow delivery split, such as, for example, 60/40, 70/30, or even 80/20 percent of flow delivery to minimize pump power consumption while providing optimal flow delivery to the transmission. In certain transmissions, however, such as continuously variable transmissions, the transmission employs both high pressure and low pressure hydraulic fluid. Accordingly, the arrangement of pumps 12 and 14 enable the delivery of both low pressure and high pressure hydraulic fluid to best optimize pump power consumption.

In some arrangements, the flexible binary pump 10 employs a single balanced vane pump for either the low pressure or high pressure pump and a Gerotor gear pump for the other pump, employed typically to supply low pressure hydraulic fluid for cooling and lubrication requirements of the transmission.

The description of the invention is merely exemplary in nature and variations that do not depart from the gist of the invention are intended to be within the scope of the invention. Such variations are not to be regarded as a departure from the spirit and scope of the invention.

What is claimed is:

1. A flexible binary pump system for a motor vehicle transmission comprising:
    a shaft;
    a first vane pump mounted on the shaft, the first vane pump having a first rotor with a first diameter and a first width, the first vane pump providing hydraulic fluid to the transmission at a first pressure; and
    a second vane pump mounted on the shaft, the second vane pump having a second rotor with a second diameter and a second width, the second vane pump providing hydraulic fluid to the transmission at a second pressure, the first diameter, first width, second diameter and second width being selected to optimize power consumption of the binary pump system and hydraulic fluid budget for the transmission;
    a first pressure regulator valve that receives hydraulic fluid from the first pump or a combination of hydraulic fluid from the first pump and from the second pump, the first pressure regulator valve providing the hydraulic fluid from the first pump to a first portion of the transmission or the combination of hydraulic fluid from the first pump and the second pump to the first portion and to a second portion of the transmission; and
    a second pressure regulator valve that receives hydraulic fluid from the second pump and provides the hydraulic fluid from the second pump to the second portion of the transmission.

2. The binary pump system of claim 1 wherein the transmission is an automatic transmission.

3. The binary pump system of claim 1 wherein the transmission is a continuously variable transmission.

4. The binary pump system of claim 1 wherein the first pump and the second pump are balanced vane pumps.

5. The binary pump system of claim 4 wherein the first rotor has a first surface area and the second rotor has a second surface area, the first surface area and the second surface area being minimized to reduce frictional losses of the first vane pump and the second vane pump while each of the first pump and the second pump remain balanced to minimize side loads on the shaft.

6. The binary pump system of claim 1 wherein the first rotor has a first set of vanes and the second rotor has a second set of vanes, the first set of vanes being circumferentially offset form the second set of vanes to mitigate tonal noise emanating from the binary pump system.

7. The binary pump system of claim 1 wherein discharge ports of the first pump are circumferentially offset from the orientation of discharge ports of the second pump to mitigate pressure ripple disturbances.

8. The binary pump system of claim 1 wherein the first pressure is greater than the second pressure.

9. The binary pump system of claim 8 wherein the binary pump delivers the hydraulic fluid at the first pressure and the hydraulic fluid at the second pressure at a desired demand.

10. A hydraulic control system of a motor vehicle transmission comprising:
    a binary pump including a first pump and a second pump;
    a first pressure regulator valve that receives hydraulic fluid from the first pump or a combination of hydraulic fluid from the first pump and from the second pump, the first pressure regulator valve providing the hydraulic fluid from the first pump to a first portion of the transmission or the combination of hydraulic fluid from the first pump and the second pump to the first portion and to a second portion of the transmission; and
    a second pressure regulator valve that receives hydraulic fluid from the second pump and provides the hydraulic fluid from the second pump to the second portion of the transmission.

11. The hydraulic control system of claim 10 wherein the transmission is a continuously variable transmission (CVT).

12. The hydraulic control system of claim 11 wherein the hydraulic fluid from the first pump is at a first pressure and the hydraulic fluid from the second pump is at a second pressure, the first pressure being greater than the second pressure.

13. The hydraulic control system of claim 11 wherein the first portion includes pulleys of the CVT.

14. The hydraulic control system of claim 11 wherein the second portion includes a torque converter, clutches, gears and a final drive gear set of the CVT.

15. The hydraulic control system of claim 10 wherein the first pump is a vane pump.

16. The hydraulic control system of claim 10 wherein the second pump is a vane pump, the first pump having a first rotor with a first diameter and a first width and the second pump having a second rotor with a second diameter and a second width, the first width, the first diameter, the second width and the second diameter each being selectively chosen to optimize a hydraulic fluid budget for the transmission.

17. The hydraulic control system of claim 16 wherein the binary pump operates with a high speed fill limit that is near or greater than a maximum operating speed of the motor vehicle's internal combustion engine.

18. The hydraulic control system of claim 10 wherein the first pump is a vane pump and the second pump is a Gerotor pump.

19. The hydraulic control system of claim 10 wherein the transmission is an automatic transmission.

\* \* \* \* \*